United States Patent [19]

Mandelcorn

[11] 4,259,708
[45] Mar. 31, 1981

[54] CAPACITOR WITH ESTER DIELECTRIC FLUID

[75] Inventor: Lyon Mandelcorn, Pittsburgh, Pa.

[73] Assignee: Westinghouse Electric Corp., Pittsburgh, Pa.

[21] Appl. No.: 970,884

[22] Filed: Dec. 19, 1978

[51] Int. Cl.³ .............................................. H01B 3/22
[52] U.S. Cl. .................... 361/318; 361/315; 361/319
[58] Field of Search ............... 361/315, 318, 319; 252/63.7, 64

[56] References Cited

U.S. PATENT DOCUMENTS

| 3,673,093 | 6/1972 | Ricchi | 361/319 X |
| 3,740,625 | 6/1973 | Ross | 361/315 |
| 3,812,407 | 5/1974 | Nose | 361/315 |
| 3,833,978 | 9/1974 | Eustance | 361/315 X |
| 3,855,508 | 12/1974 | Ross | 361/315 |
| 4,121,275 | 10/1978 | Ross | 361/315 X |

FOREIGN PATENT DOCUMENTS 1412610  8/1965  France ........................................ 252/64

Primary Examiner—Richard R. Kucia
Attorney, Agent, or Firm—R. D. Fuerle

[57] ABSTRACT

A capacitor is disclosed of alternating layers of plastic film and metal foil impregnated with a dielectric fluid which is an ester of a benzene tri- or tetracarboxylic acid. The esters are preferably trimellitic acid esters, especially tri-isodecyl-trimellitate. The dielectric fluid is sufficiently non-flammable to meet safety requirements and has a relatively high dielectric constant and low power factor.

13 Claims, 3 Drawing Figures

CAPACITOR WITH ESTER DIELECTRIC FLUID

BACKGROUND OF THE INVENTION

In the development of dielectric fluids to replace polychlorinated biphenyls for transformers and capacitors, it was found feasible to develop separately fire resistant fluids specifically for transformers, and other fluids for capacitors that are not as fire resistant. Polychlorinated biphenyls (PCB's) were used in both applications because they possess good dielectric and physical properties and high fire resistance, especially where safety is important as it is with indoor distribution transformers. But their use was discontinued because the PCB's posed possible ecological and health problems. The fluids available now for capacitors are highly aromatic for good corona resistance, such as Wemcol dielectric fluid (isopropylbiphenyl), or else have a relatively high dielectric constant, such as the phthalate esters. They are not highly fire resistant, but this compromise was reluctantly allowed with the justification that capacitors contain relatively small amounts of fluid and do not present a serious fire hazard. For transformers, which have to satisfy more stringent fire safety requirements, two fluids are available—50 centistoke dimethyl silicone, and a high molecular weight hydrocarbon. These have Cleveland Open Cup Test fire points that are above 300° C., which is the minimum level presently acceptable for fire resistant electrically insulating fluids. But their dielectric properties are relatively poor for use in capacitors, since they have low dielectric constants and poor corona resistance. It is obvious that it would be desirable to have a capacitor dielectric fluid available that is both fire resistant and has satisfactory electrical properties.

The difficulty in finding or developing such a fluid can be seen by considering the often conflicting characteristics needed or desired. Practical and economic considerations require that the fluid be organic. It should possess polarity or aromaticity, for respectively high dielectric constants in low voltage capacitors or corona resistance in high voltage capacitors, and should have low conductivity or dissipation factor. It should have low vapor pressure, about 5 Torr or less at 300° C., to satisfy the fire resistance requirement; this usually means the molecules must contain at least about 35 carbon atoms. The fluid must be a liquid (i.e., non-crystalline) at at least −30° C., and this is helped by the presence of aliphatic groups. It should easily impregnate a dielectric winding containing film, for example film-paper or all film, which in general seems to require relatively low viscosity and small molecular size. But a molecular characteristic that is responsible for the attainment of one of these properties can harm one or more of the others. Aromaticity, polarity and high molecular weight promote solidification at moderate temperatures. Also, high molecular weight and concomitant high viscosity impede impregnation of film. Polarity causes the conductivity to increase. Aliphatic groups diminish corona resistance. In view of this, finding material that is both fire resistant and has good enough dielectric properties for capacitors is a matter of chance and cannot be predicted.

PRIOR ART

U.S. Pat. No. 3,740,625 discloses a capacitor impregnated with an ester of trimellitic acid (column 4, lines 5 to 18).

U.S. Pat. Nos. 3,948,787 and 3,855,508 disclose capacitors impregnated with esters of benzene carboxylic acids.

SUMMARY OF THE INVENTION

I have discovered that certain esters of benzene tri- and tetra- carboxylic acids, especially tri-isodecyl trimellitate, have sufficiently high fire points to meet safety requirements for capacitors. The dielectric constant is higher than those of some other fluids being used or considered for use in capacitors, and the dissipation factor is sufficiently low. Resistance to corona is comparable to other acceptable capacitor fluids.

It is surprising that these dielectric fluids perform so well in capacitors because the prior art (see U.S. Pat. No. 3,740,625) teaches against using them.

DESCRIPTION OF THE INVENTION

Figure 1:
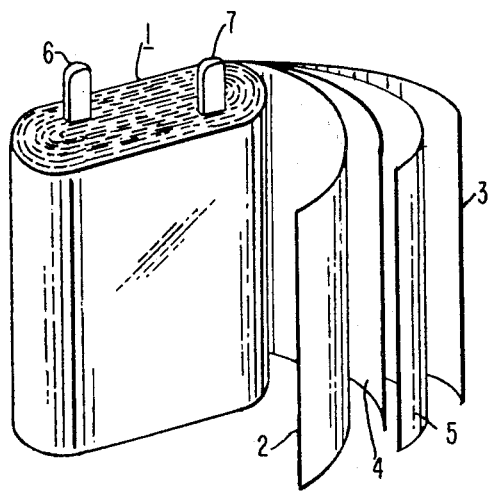
FIG. 1 is a perspective view of a partially uncoiled convolutely wound capacitor.

Capacitor devices employing the present invention may have the general structure and configuration as shown in FIG. 1 which is a convolutely wound capacitor 1 comprising separate electrode foils or armatures 2 and 3 and contiguous dielectric spacers 4 and 5 which are respectively polypropylene film and paper, and appear also on the other side of foil 3. Terminal connectors 6 and 7 have enlarged surfaces (not shown) in contact with electrode foils 2 and 3. Electrode foils 2 and 3 may comprise one or more of a number of different materials, generally metallic and including, for example, aluminum, copper, and stainless steel. The dielectric spacer materials, and the voids within and between the materials and the electrode foils are impregnated with a dielectric fluid composition.

Figure 2:
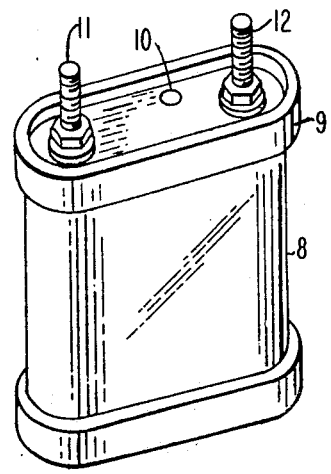
FIG. 2 shows a fully assembled capacitor which contains a convolutely wound capacitor of the type shown in FIG. 1 and a dielectric fluid impregnant.

Referring now to FIG. 2, there is shown an assembled capacitor unit in which is encased a convolutely wound capacitor of the type shown in FIG. 1. The assembled unit includes a container 8, a hermetically sealed cover 9 which includes a small dielectric fluid fill hole 10 and a pair of terminals 11 and 12 projecting through cover 9, or top, and insulated therefrom. Within the container 8 terminals 11 and 12 are connected to terminal connectors 6 and 7 shown in FIG. 1. Although not illustrated, the unit shown in FIG. 2 further includes the dielectric fluid composition which occupies the remaining space in container 8 not occupied by the capacitor element and which also impregnates the dielectric spacers 4 and 5.

The capacitors of this invention either use both film and paper as a dielectric or else use all film. The film may be polyethylene terephthalate, polyethylene, polypropylene, or other suitable plastic. Polypropylene is preferred because it is inexpensive and has a low dissipation factor. Because thicker films are more difficult to impregnate with the dielectric fluid of this invention, the total film thickness preferably does not exceed 100 gauge. The capacitors will therefore preferably be rated at less than 1500 volts as higher rated capacitors require thicker films.

The dielectric fluid of this invention is an ester of a benzene tri- or tetra-carboxylic acid of the general formula

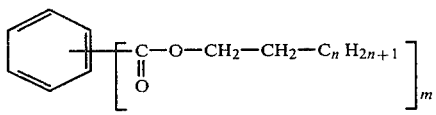

where "m" is 3 or 4 and "n" is an integer from 7 to 10. Esters of benzene tricarboxylic acids are preferred, especially esters of trimellitic acid, as they have a good balance of high dielectric constant and low dissipation factor. Tri-isodecyl trimellitate (hereinafter "TDT") is most preferred because it is commercially available and works very well.

The ester group has from 9 to 12 carbon atoms in it, and preferably has from 10 to 12 carbon atoms, as fewer carbon atoms will result in a fire point that is too high, and more carbon atoms will result in a dielectric fluid which is not a liquid at low temperatures. Larger ester groups may be used if the dielectric fluid has satisfactory fluid properties over the desired temperature range. The dielectric fluid must be a flowing liquid at room temperatures and, although it may solidify at lower temperatures, it should be crystallize (devitrify) at $-20°$ C. and preferably at $-40°$ C.

The dielectric fluid preferably includes about 0.001 to about 2% (all percentages herein are by weight) of an anti-oxidant for thermal stability. The preferred amount is about 0.5 to about 1% and the preferred anti-oxidants are di-t-butyl-paracresol, di-t-butyl phenol, or mixtures thereof.

The fluid also preferably includes about 0.1 to about 2%, and preferably about 0.1 to about 0.5%, of a hydrogen acceptor for improved corona resistance. An anthraquinone such as β-methylanthraquinone, anthraquinone, or β-chloranthraquinone may be used. Because it is readily available and more soluble β-methylanthraquinone is preferred.

The following examples further illustrate this invention.

EXAMPLE I

The following table gives various properties of triisodecyl-trimellitate, and of the two fire resistant silicone and hydrocarbon fluids for comparison.

According to these fluid data, triisodecyl-trimellitate, with a fire point of 310° C., will be useful as a fire resistant capacitor fluid for ambients as low as $-40°$ C. or lower. The dielectric constant of TDT is 3.8, substantially higher than those of the other two fluids, and it gives TDT an added advantage over them for use in capacitors. Also, TDT's dissipation factor is sufficiently low for the use in capacitors. The gassing coefficients of the three fluids are rather equivalent, about zero, but the gassing coefficient of TDT is more negative than the others, indicating that it would be somewhat more resistant to corona. However, the gassing coefficients of di-2-ethyl hexyl phthalate, which are used for low voltage capacitors, were found to be $-30$ l/min. and the $-11$ l/min. which are not very much more negative than that of TDT. But, for comparison, Wemcol, isopropyl biphenyl, has a gassing coefficient of $-150$ to $-200$ l/min., and it has excellent corona resistance for high voltage, where this is very important. Although the viscosity of triisodecyltrimellitate is rather high, it did not present a problem in the impregnation of film-paper capacitors. Triisodecyltrimellitate appeared visually to have good fluid characteristics as low as $-60°$ C. as did the silicone. Neither of these fluids developed a funnel on top as the RTE hydrocarbon did at $-40°$ C. This latter effect could be detrimental to the insulation capability of the fluid at low temperatures, with possible withdrawal of the fluid from vital high voltage stress regions.

EXAMPLE 2

Capacitor tests were made with capacitors containing film-paper dielectric windings impregnated with triisodecyl-trimellitate. These units were of the small oval ballast capacitor type, and only the outer part of the windings was active, with a capacitance of 0.1 to 0.2 μF. The film-paper units, one layer of 33 gauge polypropylene film and one of 35 gauge paper, were evacuated for 40 hours at 130° C. and impregnated at 80° C. The impregnant, triisodecyl-trimellitate, contained 0.5% β-methyl anthraquinone plus 0.2% di-tert-butyl paracresol.

The rated voltages for these capacitors were based on those of their polychlorinated biphenyl impregnated counterparts, to achieve the same capacitance-voltage squared product.

The results of the tests made with these impregnated polypropylene film-paper capacitors show that triisodecyl-trimellitate is compatible with polypropylene film and paper in forming a composite insulator system.

| Property | Triisodecyl-Trimellitate | 50 cs Dimethyl Silicone, DC 561 | RTE Corp. Hydrocarbon |
|---|---|---|---|
| Flash point, °C. | 274 | 285 | 278 |
| Fire point, °C. | 310 | 342 | 300 |
| Dielectric constant @ 100° C. | 3.8 | 2.7 | 2.2 |
| Dissipation factor @ 100° C., % | 1.5 | 0.9 | 1.3 |
| Resistivity @ 100° C., μ-cm | $5 \times 10^{11}$ | | |
| Dielectric strength, ASTM D877, kV | 48 | 35 | 37 |
| Gassing at 10 kV, $H_2$, ASTM D2300, μL/min | $-2$ | 13 | 5 |
| Pour point, °C. | $-28$ to $-30$ | $-55$ | $-28$ |
| Appearance at $-40°$ C. and $-60°$ C. | Fluidlike throughout, flat on top | Fluidlike throughout, flat on top | Somewhat hazy, funnel depression on top |
| Viscosity @ 100° F., cs | 160 | 50 | 150 |
| Neutralization no., mg KOH/g | 0.03 | <0.01 | 0.01 |

The corona discharge inception and extinction voltages of these capacitors are satisfactory, as seen in the following table. The table also gives discharge pulse magnitudes in pico-coulombs (pC). A Wemcol, dielectric fluid isopropyl biphenyl impregnated capacitor is included for comparison.

| AFpA* 33-35 Capacitors Impregnated With | Corona Discharge Voltage, V | | | |
|---|---|---|---|---|
| | Inception | | Extinction @ | |
| | @ 25° C. | @ −40° C. | @ 25° C. | −40° C. |
| Triisodecyl-trimellitate | 1600(300 pC) | 1000(50 pC) | 500 | 900 |
| Wemcol dielectric fluid | 2400(200 pC) | 1300(40 pC) | 2000 | 700 |

*Aluminum - polypropylene film - paper - aluminum

This indicates that triisodecyl-trimellitate easily impregnates film and paper, since no special efforts were made in the impregnation. Here, as with 100% paper, the corona inception voltage of the triisodecyl-trimellitate impregnated capacitors are high enough to avoid the occurrence of corona discharges with overvoltages as high as 2.6 times rated (rated is 600 volts here). But, their low extinction voltage is indicative of poor corona resistance compared to Wemcol dielectric fluid impregnated capacitors. This disadvantage may be offset by the fire resistance of triisodecyl-trimellitate.

These triisodecyl trimellitate impregnated capacitors, however, performed well in a special overvoltage test. A test capacitor was subjected repeatedly every three minutes to an overvoltage of 6 cycles, at 60 Hz, and 3 times the magnitude of a continuously applied 60 Hz voltage, $V_c$; and after about 1500 such 6 cycle overvoltages, the continuously applied voltage was successively raised by 100 volts. The results of this test are presented in the table below, giving the highest continuous voltages, $V_c$, sustained without failure. Comparison is made between TDT and Wemcol dielectric fluid impregnated capacitors.

| Impregnant | Highest Steady Voltage, $V_B$, with 3 × $V_B$ OV's sustained, volts | Discharge Pulses during these OV's, pC |
|---|---|---|
| Triisodecyl-trimellitate | 700, 800 | 16 × 10³ |
| Wemcol dielectric fluid | 900, 900 | 30 × 10³ |

It is evident that the TDT impregnated dielectric has sufficient corona resistance, according to this test, for its proposed rated voltage of 600 volts, that it would resist many overvoltages of the unlikely magnitude of 3 times rated voltage. This dielectric was not much less corona resistant than that impregnated with the known corona resistant impregnant, Wemcol dielectric fluid.

The magnitude of the corona inception voltage at −40° C. shows that triisodecyl-trimellitate insulates effectively at that temperature.

These capacitors were also evaluated for stability on aging at 100° C. with 700 volts applied. Wemcol dielectric fluid impregnated units were included because they are known to operate stably in service, and hence, provide a basis for comparison. The aging results are given in the following table.

| AFpA* 33-35 Capacitors Impregnated With | Power Factor, %, at 100° C., 700 V after Aging (Days) | | | | |
|---|---|---|---|---|---|
| | 1 | 10 | 16 | 24 | 30 |
| Triisodecyl-trimellitate | 0.13 | 0.14 | 0.16 | 0.19 | 0.20 |
| Wemcol | 0.13 | 0.15 | 0.16 | 0.16 | |

*Aluminum - polypropylene film - paper - aluminum

It can be seen from these data that the triisodecyl-trimellitate impregnated film-paper capacitors are as stable on normal operation as ones with Wemcol dielectric fluid.

From all these capacitor test results, it can be seen that triisodecyl-trimellitate, or a fluid similar to it, would be a good fire resistant low voltage capacitor impregnant.

EXAMPLE 3

An extensively used test for flammability is the Cleveland Open Cup Test (ASTM D-92). In that test the fluid is gradually heated and, after every 5° C. rise in its temperature, a flame is passed over the fluid. The temperature at which the fluid flashes, and the (higher) temperature at which it burns continuously (for at least 5 seconds), the fire point, are recorded. According to this test, a fluid is often adjudged acceptably fire-resistant if it has a fire point higher than 250° C. even though it burns above that fire point.

Almost every material, even polytetrafluoroethylene, will burn at some temperature. Moreover, electrical arcs are at a very high temperature. Thus, if the fluid is exposed to the air, such as by a failure rupture, it may be ignited by an electric arc and burn even though it is not flammable by the Cleveland Open Cup Test.

For that reason, whether a fluid is "flammable" as used herein is determined by whether the fluid will burn unassisted after exposures to a flame or arc at temperatures below its boiling point. (A fluid cannot be heated above its boiling point.) It may be ignited, but it must stop burning when the flame or arc is removed, if it is to be "fire-resistant." Such a "fire-resistant" fluid would not spread a fire when spilled or thrown from an electrical device which has failed with high current arcing.

Figure 3:
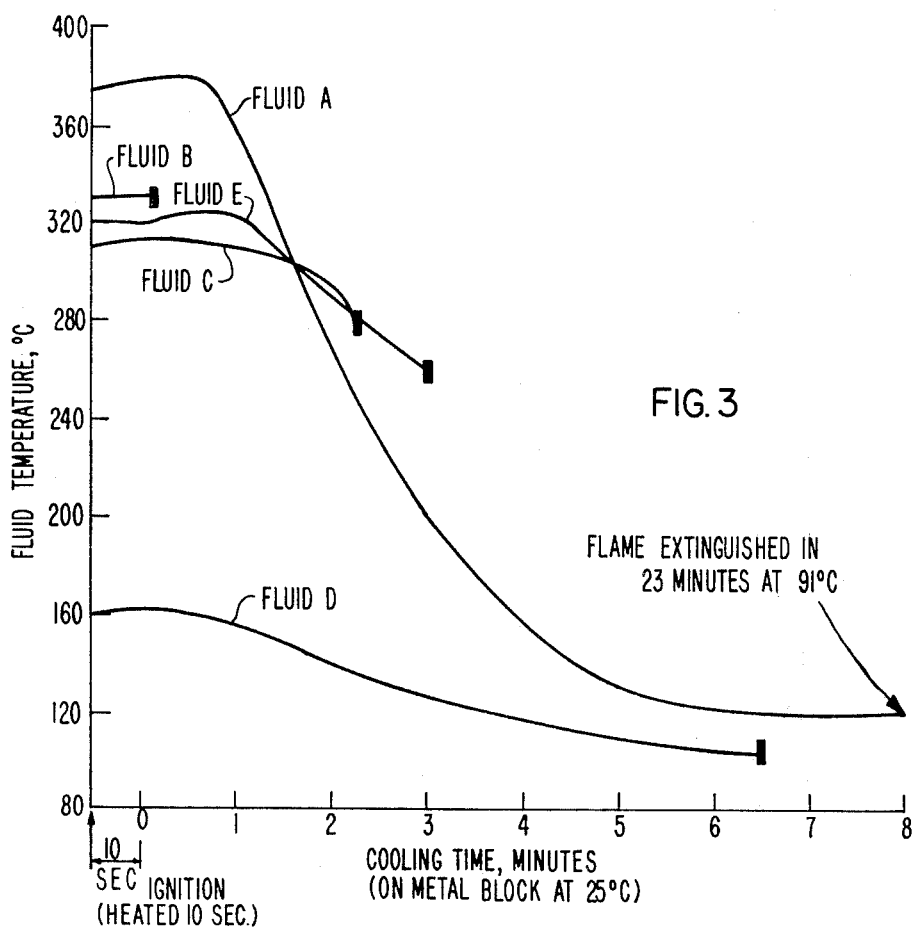
FIG. 3 is a graph showing the results of testing various dielectric fluids for flammability.

Various fluids were gradually heated in a modification of the Cleveland open cup test, and tested to determine their temperature at ignition by exposure to a flame. The temperature and time at which they ceased burning during a subsequent cooling stage was also noted. FIG. 2 gives the results. In FIG. 3, Fluid A is dimethyl silicone, 50 cs, Fluid B is trichlorobiphenyl, Fluid C is RTE Corporation's hydrocarbon (mole. wt.=500–700), Fluid D is mineral transformer oil, and Fluid E is TDT. Fluids A and C have been accepted by insurance underwriters as fire resistant electrical insulating fluids. The small rectangles at the end of each curve indicates the extinguishment of the flame. The drawing shows that only Fluids A and B ignited at a higher temperature than TDT, and that TDT stopped burning after three minutes, after it had cooled to about 260° C. This test shows that TDT has superior fire resistance to Fluid A, because it extinguishes sooner, and is equivalent in fire resistance to Fluid C.

EXAMPLE 4

Film-paper test capacitors described in Example 2, impregnated with TDT and various additives, were aged for 80 days at 85° C. and 100° C., and were checked for power factor during the aging period. The capacitors were about 0.12 μF and used 0.33 mil polypropylene film and 0.35 mil paper; 700 volts AC was applied continuously. The following table gives the results.

| % Additive | | Power factor, % | | | |
|---|---|---|---|---|---|
| di-tert-butyl paracresol | β-methyl anthraquinone | At 85° C. | | At 100° C. | |
| | | Initial | After 80 days | Initial | After 80 days |
| 0.2 | 0.5 | — | — | 0.13 | 0.38 |
| 0.4 | 0 | 0.13 | 0.16 | 0.13 | 0.32 |
| 1 | 0.5 | 0.12 | 0.14 | 0.12 | 0.21 |

The above table shows that the anti-oxidant, di-tert-butyl paracresol, enhances the stability of the capacitors, with increasing concentration over the range studied. The capacitors with 1% of this additive were the most stable. This is surprising because these capacitors were hermetically sealed and therefore their contents were not subjected to oxidation.

EXAMPLE 5

Corona discharge inception voltages and ease of impregnability were determined for various configurations of TDT impregnated polypropylene film-paper test capacitors. The following table gives the results.

| Winding Configuration | Film and Paper Thicknesses (gauge)* | Ease of Impregnation (1 = easiest) | Corona Discharge Inception Voltage KV | Voltages Stress KV/mil** |
|---|---|---|---|---|
| AFpA | 33-35 | 1 | 1.6 | 3.2 |
| AFpa$_r$ | 33-35 | 1 | 2.7 | 5.5 |
| AFpFa$_r$ | 33-35-33 | 2 | 2.0 | 2.4 |
| AFpFa$_r$ | 33-35-33 | 2 | 3.3 | 4.0 |
| ApFpa$_r$ | 45-100-45 | 3 | 3.9 | 2.75 |
| AFpFa$_r$ | 50-45-50 | 3 | 3.8 | 3.0 |
| AFpFa$_r$ | 75-45-75 | 4 | [3.8] | |
| AFpa$_r$ | 100-45 | 5 | [2.3] | |

*1 gauge = 0.01 mil
**Equivalent film thickness
The bracketed discharge inception voltages are valves that are below those expected for well-impregnated capacitors.

In the above table "a$_r$" in the winding configuration indicates aluminum foil which is narrower than the "A" aluminum foil and has rounded (folded) edges. The above table shows that TDT can be used as an impregnant for film-paper capacitors with ratings up to about 1500 volts, as the corona inception voltage should be about twice the rated voltage.

I claim:

1. A capacitor comprising a multiplicity of alternating layers of plastic film and metal foil impregnated with a dielectric fluid which comprises an ester of a benzene tri- or tetra- carboxylic acid, where said ester group has the general formula

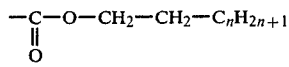

where n is an integer from 7 to 10.

2. A capacitor according to claim 1 wherein at least one layer of paper accompanies each layer of plastic film.

3. A capacitor according to claim 1 wherein said plastic film is polypropylene.

4. A capacitor according to claim 1 wherein said dielectric fluid is an ester of a benzene tricarboxylic acid.

5. A capacitor according to claim 4 wherein said tricarboxylic acid is trimellitic acid.

6. A capacitor according to claim 5 wherein n in said formula is 8.

7. A capacitor according to claim 1 wherein said dielectric fluid includes about 0.01% to about 2% of an anti-oxidant.

8. A capacitor according to claim 7 wherein said anti-oxidant is di-tert-butyl paracresol.

9. A capacitor according to claim 1 wherein said dielectric fluid includes about 0.1% to about 2% of a hydrogen acceptor.

10. A capacitor according to claim 9 wherein said hydrogen acceptor is β-methyl anthraquinone.

11. A capacitor according to claim 1 wherein the total thickness of said plastic film between layers of said metal foil is up to 100 gauge.

12. A capacitor according to claim 1 which is rated for up to 1500 volts.

13. A capacitor comprising layers of metal foil separated by plastic film dielectric up to 100 gauge in total thickness, impregnated with a dielectric fluid which comprises an ester of a benzene tri- or tetra-carboxylic acid, where said ester group has the general formula —$CH_2$—$CH_2$—$C_nH_{2n+1}$ where in is an integer from 7 to 10.

* * * * *